(12) United States Patent
Kusunoki

(10) Patent No.: US 9,197,302 B2
(45) Date of Patent: Nov. 24, 2015

(54) MIMO COMMUNICATION METHOD

(71) Applicant: Sony Corporation, Tokyo (JP)

(72) Inventor: Shigeo Kusunoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/507,404

(22) Filed: Oct. 6, 2014

(65) Prior Publication Data

US 2015/0139345 A1    May 21, 2015

Related U.S. Application Data

(60) Provisional application No. 61/907,124, filed on Nov. 21, 2013.

(51) Int. Cl.
| | |
|---|---|
| *H04L 1/02* | (2006.01) |
| *H04B 7/04* | (2006.01) |
| *H04B 7/06* | (2006.01) |
| *H04L 5/00* | (2006.01) |
| *H04L 5/02* | (2006.01) |
| *H04L 27/26* | (2006.01) |

(52) U.S. Cl.
CPC ............ *H04B 7/0456* (2013.01); *H04B 7/0639* (2013.01); *H04L 5/0021* (2013.01); *H04L 5/026* (2013.01); *H04L 27/265* (2013.01); *H04L 27/2628* (2013.01)

(58) Field of Classification Search
CPC ....... H04L 1/608; H04L 1/06; H04L 27/2628; H04B 7/0452; H04B 7/0417; H04J 13/004
USPC .................. 375/286, 130, 140, 267, 347, 349
See application file for complete search history.

(56) References Cited

U.S. PATENT DOCUMENTS

| | | | |
|---|---|---|---|
| 6,088,399 A * | 7/2000 | Luz et al. ................... | 375/260 |
| 2002/0122465 A1 | 9/2002 | Agee et al. | |
| 2012/0155423 A1 | 6/2012 | Kishiyama et al. | |
| 2014/0126611 A1 * | 5/2014 | Bang et al. ................... | 375/140 |

FOREIGN PATENT DOCUMENTS

EP    1 668 855 B1    8/2008

OTHER PUBLICATIONS

Extended European Search Report issued May 13, 2015 in Patent Application No. 14192334.2.

* cited by examiner

*Primary Examiner* — Khai Tran

(74) *Attorney, Agent, or Firm* — Oblon, McClelland, Maier & Neustadt, L.L.P.

(57) ABSTRACT

A method of achieving diversity in a multiple-input-multiple-output (MIMO) communication system. The MIMO communication system has a lower number of receiving antennas compared to the number of transmitting antennas. In the MIMO communication system, selection diversity is achieved by using a switch that selectively chooses a receiver antenna based on a signal to noise ratio of the signal captured by the receiving antenna. Alternatively, the signals that are received by the respective receiving antennas are combined in order to achieve combination diversity.

20 Claims, 11 Drawing Sheets

FIG. 9

Matrix_A $$\begin{pmatrix} Rx0(f_j) \\ Rx1(f_j) \end{pmatrix} = \begin{pmatrix} h00(f_j) & h10(f_j) & h20(f_j) & h30(f_j) \\ h01(f_j) & h11(f_j) & h21(f_j) & h31(f_j) \end{pmatrix} \begin{pmatrix} Tx\#0 \\ Tx\#1 \\ Tx\#2 \\ Tx\#3 \end{pmatrix}$$

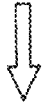

Matrix_B1

$$\begin{pmatrix} Rx0(f_j) + Rx0(f_{j+1}) \\ Rx1(f_j) + Rx1(f_{j+1}) \end{pmatrix} = \begin{pmatrix} h00(f_j) + h00(f_{j+1}) & h10(f_j) + h10(f_{j+1}) \\ h01(f_j) + h01(f_{j+1}) & h11(f_j) + h11(f_{j+1}) \end{pmatrix} \begin{pmatrix} Tx\#0 \\ Tx\#1 \end{pmatrix}$$

Matrix_B2

$$\begin{pmatrix} Rx0(f_j) - Rx0(f_{j+1}) \\ Rx1(f_j) - Rx1(f_{j+1}) \end{pmatrix} = \begin{pmatrix} h20(f_j) + h20(f_{j+1}) & h30(f_j) + h30(f_{j+1}) \\ h21(f_j) + h21(f_{j+1}) & h31(f_j) + h31(f_{j+1}) \end{pmatrix} \begin{pmatrix} Tx\#2 \\ Tx\#3 \end{pmatrix}$$

FIG. 11

Matrix_A $$\begin{pmatrix} Rx0(f_j) \\ RxN(f_j) \end{pmatrix} = \begin{pmatrix} h00(f_j) & h10(f_j) & h20(f_j) & h30(f_j) \\ h0N(f_j) & h1N(f_j) & h2N(f_j) & h3N(f_j) \end{pmatrix} \begin{pmatrix} Tx\#0 \\ Tx\#1 \\ Tx\#2 \\ Tx\#3 \end{pmatrix}$$

⇩

Matrix_B1

$$\begin{pmatrix} Rx0(f_j) + Rx0(f_{j+1}) \\ RxN(f_j) + RxN(f_{j+1}) \end{pmatrix} = \begin{pmatrix} h00(f_j) + h00(f_{j+1}) & h10(f_j) + h10(f_{j+1}) \\ h0N(f_j) + h0N(f_{j+1}) & h1N(f_j) + h1N(f_{j+1}) \end{pmatrix} \begin{pmatrix} Tx\#0 \\ Tx\#1 \end{pmatrix}$$

Matrix_B2

$$\begin{pmatrix} Rx0(f_j) - Rx0(f_{j+1}) \\ RxN(f_j) - RxN(f_{j+1}) \end{pmatrix} = \begin{pmatrix} h20(f_j) + h20(f_{j+1}) & h30(f_j) + h30(f_{j+1}) \\ h2N(f_j) + h2N(f_{j+1}) & h3N(f_j) + h3N(f_{j+1}) \end{pmatrix} \begin{pmatrix} Tx\#2 \\ Tx\#3 \end{pmatrix}$$

MIMO COMMUNICATION METHOD

CROSS-REFERENCE TO RELATED APPLICATIONS

This application is based upon and claims the benefit of priority under 35 U.S.C. §119(e) from the prior Provisional U.S. Patent Application Ser. No. 61/907,124, filed on Nov. 21, 2013, the entire contents of which are herein incorporated by reference.

FIELD OF THE DISCLOSURE

The present disclosure relates to a multiple-input-multiple-output (MIMO) system and a communication method thereof.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

MIMO communication techniques are generally deployed for increasing the transmission capacity of a communication system. The MIMO system includes a transmitter and a receiver that communicate via N communication lines (channels) at a transmitting side and N communication lines at a receiving side, wherein N is a integer. For instance, in a wireless communication network, the transmitter may include N transmit antennas and the receiver may include N receiving antennas. Thus, the MIMO communication system enables to secure a communication capacity that is N times larger than that of a single communication line, and as a result yields a greater communication speed as compared to the single communication line.

The technique of MIMO communication used in practise is a single user-MIMO (SU-MIMO). Research efforts are directed towards expanding the SU-MIMO to a multi user-MIMO (MU-MIMO), with a focus of improving the frequency utilization efficiency by using orthogonal channels, a unified operation of multiple cells, and the like.

In MIMO communication systems, the number of antennas deployed at the transmitting side and the receiving side are the same. For instance, in a MIMO communication system that is referred to as N×N MIMO system, there are N antennas included at the transmitting side, and N antennas at the receiving side. A 4×4 MIMO is specified in the Long Term Evolution (LTE) standard of Third generation Paternership Project (3GPP), which serves as a standard for commercially available wireless phones. Further, LTE specifies next generation MIMO systems to be of order 8×8. In order to achieve such standards, a mobile phone terminal would need to be equipped with four to eight antennas. On the other hand, for a mobile phone terminal, there is a requirement and/or desire to reduce the size of the mobile phone casing. Thus, the number of antennas that can be equipped within the mobile terminal is limited due to size constraints. In practice, the maximum number of antennas that can be mounted on the mobile phone terminal is two, and it may be difficult to mount additional antennas as it would increase the design and packaging complexity of the mobile terminal.

Currently, the LTE standard defines a 2×2 MIMO system that is in practical use. For example, in the LTE operated in Japan, the maximum communication speed (theoretically) reaches 37.5 Mbps when 16 QAM signals are used as the subcarriers with a bandwidth of 5 MHz. However, the actual communication speed achieved is approximately 5 Mbps on field tests. It is conceivable that the difference in communication speeds is due to traffic congestion and signal reception quality. The signal reception quality is a characteristic of bit error rate (BER) and signal to noise ratio (SN) ratio. In urban areas such as Tokyo, the SN ratio is usually about 5-10 dB. Even when a 5 dB improvement is achieved by introducing code error correction (by using convolution coding such as Viterbi codes and Reed-Solomon codes), the SN ratio is of the order 10-15 dB. On the other hand, when the 16 QAM modulation is performed by applying a maximum likelihood detection technique in the 2×2 MIMO system, a SN ratio of 15 dB or more is required to secure a BER of $10^{-3}$. Thus, in such a communication environment, high-speeds are not realised by merely using a higher order modulation.

In view of the above, a technique capable of reducing the number of antennas at the receiver while maintaining the communication speed by applying a code division multiple access-orthogonal frequency division multiplexing (CDMA-OFDM) technique is described in U.S. provisional patent application No. 61/776,161, and is incorporated herein by reference. A variation of the CDMA-OFDM technique is also described in U.S. provisional patent application No. 61/835,119, and is also incorporated herein by reference.

In the U.S. Provisional applications 61/776,161 and 61/835,119, the characteristic of BER and SN ratio are kept low by adopting a QPSK technique for subcarrier modulation. In doing so, an effective increase in the communication speed in low SN environments is realized. The number of antennas at the receiver may be one or one half (N/2) of the number of transmitter antennas to enable wireless communication at a rate effectively comparable to that of a (4×4) MIMO system. Further, the effective communication speed may be further increased by improving the reception SN ratio and/or introducing diversity in the MIMO system.

Typically, when diversity is implemented, an additional antenna is required. However, in the U.S. provisional applications (61/776,161 and 61/835,119), it was observed that there was no need to increase the number of receiver antennas even when the MIMO system is adopted. Rather, one of the antennas in a terminal was found to be redundant when the MIMO communication technique was applied to a wireless communication of a 2×2 MIMO system. It was anticipated that the communication speed may be further increased when the redundant antenna is utilized for diversity.

To that end, selection diversity and maximum ratio combining diversity are techniques that can be utilized to achieve diverstity in the communication system. Selection diversity is a method for selecting a highest SN ratio antenna from among a plurality of receiver antennas. The maximum ratio combining diversity is a method for combining received signals by matching phases of signals from multiple receiver antennas. The SN ratio may be increased when the maximum ratio combining diversity is implemented.

However, while implementing the above strategies to obtain diversity, the gains of the respective transmission channels may not be suitably adjusted to each other. Specifically, the powers of the received signals over the respective transmission channels may not be equalized and thus such diversity techniques may not be directly applicable.

Accordingly, there is a requirement for a diversity technique for MIMO communication systems, wherein the number of antennas can be reduced while adjusting the gains of the respective transmission channels.

SUMMARY

According to the present disclosure, diversity may be implemented in a MIMO system while reducing the number of receiving antennas. The reduction in the number of antennas enables to cut down transmission power and also improves the SN ratio which leads to an improved BER. Thus, effective communication speeds are realized which result in an efficient MIMO system.

Accordingly, an aspect of the present disclosure provides a multiple-input multiple-output (MIMO) communication method for a transmitter including N transmitter antennas and a receiver including M receiver antennas, where N and M are integers greater than or equal to two. The communication method includes: transmitting, by each transmitter antenna, a digital sequence including a first portion and a second portion, wherein the first portion is multiplied by a first type of orthogonal code and the second portion is multiplied by a predetermined coefficient and a second type of orthogonal code, the transmitted digital sequence being multiplied by a pre-coding coefficient that is determined by the receiver; demodulating, by processing circuitry, the received digital sequences of each receiver antenna by multiplying the received digital sequences by the first type of orthogonal code and the second type of orthogonal code; determining based on the demodulated digital sequences of the receiver antennas, a receiver antenna that has a highest signal-to-noise ratio; and notifying the transmitter of the pre-coding coefficient corresponding to the determined antenna.

According to another aspect of the present disclosure is provided a MIMO transmitter. The transmitter includes a plurality of transmitter antennas configured to transmit digital sequences at a predetermined transmission frequency. Further, the transmitter includes circuitry configured to: obtain, for each transmitter antenna, a digital sequence including a first portion and a second portion, wherein the first portion is multiplied by a first type of orthogonal code and the second portion is multiplied by a predetermined coefficient and a second type of orthogonal code. The circuitry is further configured to compute an inverse Fourier transform of the digital sequence to obtain an in-phase component and a quadrature phase component of the digital sequence, and orthogonally modulate the in-phase and quadrature components of the digital sequence to transmit the digital sequence at the predetermined transmission frequency, wherein the transmitted digital sequence is multiplied by a pre-coding coefficient that is determined by a receiver.

According to another aspect of the disclosure is provided a MIMO receiver that includes a plurality of receiver antennas configured to receive digital sequences transmitted by a plurality of transmitter antennas. The receiver further includes circuitry configured to: demodulate, for each receiver antenna, the received digital sequence by multiplying the received digital sequences by a first type of orthogonal code and a second type of orthogonal code; determine based on the demodulated digital sequences of the receiver antennas, a receiver antenna that has a highest signal-to-noise ratio; compute a pre-coding coefficient corresponding to the determined receiver antenna based on channel gains between the transmitter antennas and the receiver antennas, and diversity gains of the receiver antennas, and notify the transmitter of the pre-coding coefficient corresponding to the determined antenna.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 depicts an exemplary channel determinant that is applied to the transmitter-receiver configuration of FIG. 8;

FIG. 11 depicts an exemplary channel determinant that is applied to the transmitter-receiver configuration of FIG. 10.

DETAILED DESCRIPTION OF THE EMBODIMENTS

Figure 1:
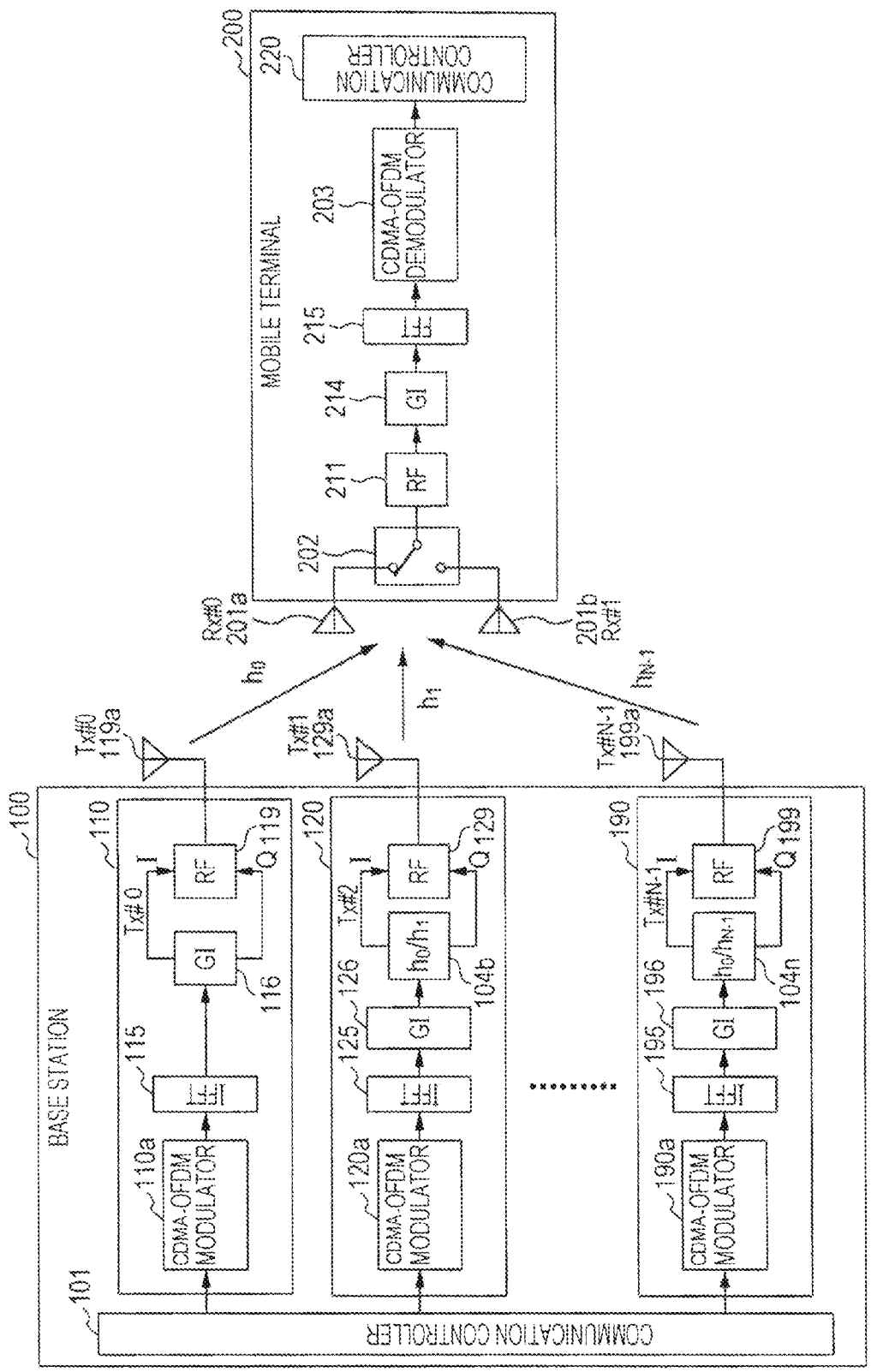
FIG. 1 is a block diagram illustrating a MIMO system according to one embodiment.

Referring now to the drawings, wherein like reference numerals designate identical or corresponding parts throughout the several views.

FIG. 1 is an exemplary block diagram illustrating a MIMO system according to one embodiment. The MIMO system includes a base station 100 that includes N transmitters 110, 120 . . . 190 and a receiver (mobile terminal) 200. FIG. 1 illustrates an example where the transmitters are included in the base station 100, such as a wireless telephony system and the receiver 200 is a receiver included in a portable mobile terminal.

In a MIMO communication system, a plurality of antennas is included at a transmitting side and a receiving side. In a typical MIMO communication, the number of antennas on the transmitting side is equal to the number of antennas on the receiving side. However, in the present embodiment the number of receiver antennas is lower than the number of transmitting antennas. Specifically, the transmitting side is equipped with N transmitting antennas, whereas the receiving side is equipped with M receiving antennas, where N is greater than M.

As shown in FIG. 1, the base station 100 includes transmitting antennas 119a, 129a . . . 199a, one transmitting antenna being assigned to each transmitter, whereas the receiver 200 is equipped with two receiving antennas (i.e., M=2) 201a and 201b, respectively. For sake of convenience, the transmitting antennas are labelled Tx #0, Tx #1 . . . Tx #N−1 and the receiving antennas are labelled Rx #0 and Rx #1.

The base station 100 includes a communication controller 101 that controls the transmission processes of all transmitters 110-190. Each transmitter includes a code division multiple access-orthogonal frequency division multiplexing (CDMA-OFDM) module 110a, 120a, and 190a respectively. The CDMA-OFDM modules perform amplitude modulation of the transmission signals that are assigned to each transmitter by the communication controller 101. The modulation process performed by the CDMA-OFDM modules 110a-190a is described in detail in U.S. Provisional application 61/776,161, and is herein incorporated by reference in its entirety.

According to an embodiment, the transmitters 110-190 have a similar configuration and the transmission frequencies of the N antennas are in a particular transmission band. However, with respect to processing of a pre-code, each of the transmitters 110-190 performs a different process from each other. The pre-coding operation performed by each transmitter is described below in detail.

Signals modulated at the CDMA-OFDM modules 110a-190a are supplied to inverse fast Fourier transformation (IFFT) modules 115, 125 . . . 195. The IFFT modules 115-195, each transform the frequency axis of the input signal to the time axis by performing an inverse fast Fourier transformation operation. Signals subjected to the IFFT modules 115-195 are supplied to guard interval insertion modules 116, 126 . . . 196, and perform insertion of guard intervals in the data sequences to be transmitted. The signals to which guard intervals are inserted by the guard interval insertion modules 116-196 are supplied to pre-coding modules 104b-104n. The pre-coding modules multiply the data streams to be transmitted by pre-coding coefficients. Note that the transmitter 110 includes no pre-coding module, as the pre-coding coefficient applied to the data signal of the first transmitter is one.

The pre-coding coefficients are used to approximately equalize powers of the N transmission lines that transmit signals to the receiver 200. Specifically, as illustrated in FIG. 1, where $h_0, \ldots h_{N-1}$ depict the channel gains between transmitter antennas 119a, 129a, . . . 199a of the transmitters 110-190 to the receiver antenna 201a or 201b of the receiver 200, the pre-coding coefficient of each transmitter is set based on the pre-coding co-efficient of a predetermined channel. For instance, in the pre-coding module 104b of the transmitter 120, the pre-coding coefficient is set to $h_0/h_1$, whereas the pre-coding module 104n of the transmitter 190 sets the pre-coding coefficient to $h_0/h_{N-1}$.

The signals that are multiplied by the pre-coding coefficients are supplied to high-frequency orthogonal modulators 119, 129 . . . 199 respectively, where orthogonal modulation of an in-phase component (I component) and a quadrature phase component (Q component) of the data signal is performed. The frequencies of the orthogonally modulated signals are converted to predetermined transmission frequencies, whereafter the signals outputted from the modulators 119-199 are wirelessly transmitted from the corresponding transmitter antennas 119a, 129a . . . 199a.

In the example depicted in FIG. 1, the receiver 200 includes two receiver antennas 201a and 201b. Of the two receiver antennas 201a and 201b, one antenna is selected by a switch 202 based on a control signal transmitted from a communication controller 220. The switch 202 is connected to a high-frequency orthogonal modulator 211 that performs orthogonal demodulation of the received signal.

The demodulated signal is supplied to a guard interval removal module 214. The guard interval removal module 214 removes the guard intervals from the signal that are inserted by the transmitters. A signal from which the guard intervals are removed is supplied to a fast Fourier transformation (FFT) module 215. The FFT module 215 performs a transformation of the signal from the time domain to a frequency domain by performing a fast Fourier transformation operation.

The output signal from the FFT module 215 is supplied to a CDMA-OFDM demodulator 203. The CDMA-OFDM demodulator 203 performs a demodulation operation of the received signal. The demodulation process performed by the CDMA-OFDM demodulator 203 is described in detail in U.S. Provisional application 61/776,161 and is incorporated herein by reference in its entirety. The signal demodulated by the CDMA-OFDM demodulator 203 is supplied to the communication controller 220.

In what follows, an operation of the base station 100 communicating with the receiver 200 is described with reference to FIG. 1.

The transmitters Tx #0-Tx #N transmit discrete signals that are included in frames that do not overlap with each other. Additional data may be added to the reference signal in order to allow for the identification of the transmission line (channel) Tx #0-Tx #N-1 where the signal originated from. The receiver 200 performs a channel estimation operation of the signal transmitted from the respective transmitters 110-190 of the base station 100. During the channel estimation operation, the receiver 200 demodulates the received signals and obtains the channel gains $h_0, h_1 \ldots h_{N-1}$ of the respective communication channels. In the example depicted in FIG. 1, the receiver 200 includes two receiver antennas 201a and 201b.

According to an embodiment, the receiver may be configured to estimate the channel gains based on estimation performed separately for each receiver antenna. Specifically, the channel gains $h_0, h_1 \ldots h_{N-1}$ are first obtained from the signal received with the receiver antenna 201a. Subsequently, the switch 202 is switched over in order to select antenna 201b, and the channel gains $h_0, h_1 \ldots h_{N-1}$ are obtained based on the signal received with the receiver antenna 201b.

Based on the channel gains $h_0, h_1 \ldots h_{N-1}$ that are obtained from the respective receiver antennas 201a and 201b, the communication controller 220 determines which receiver antenna has a better signal to noise (SN) ratio. For instance, the receiver 200 activates switch 202 to select receiver antenna 201a for signal reception when the SN ratio of antenna 201a is determined to be higher that the SN ratio of receiver antenna 201b.

The communication controller 220 transmits the channel gains $h_0, h_1 \ldots h_{N-1}$ of the respective communication channels to the base station 100. The base station 100 upon receiving the channel gains transmitted by the receiver 200, determines the pre-coding coefficients to be used for each of its transmitters 120-190. In doing so, the receiver 200 is enabled to select one of the receiver antennas 201a and 201b respectively, that has a higher SN ratio for receiving data. Therefore, the receiver 200 is capable of performing selection diversity.

Figure 2:
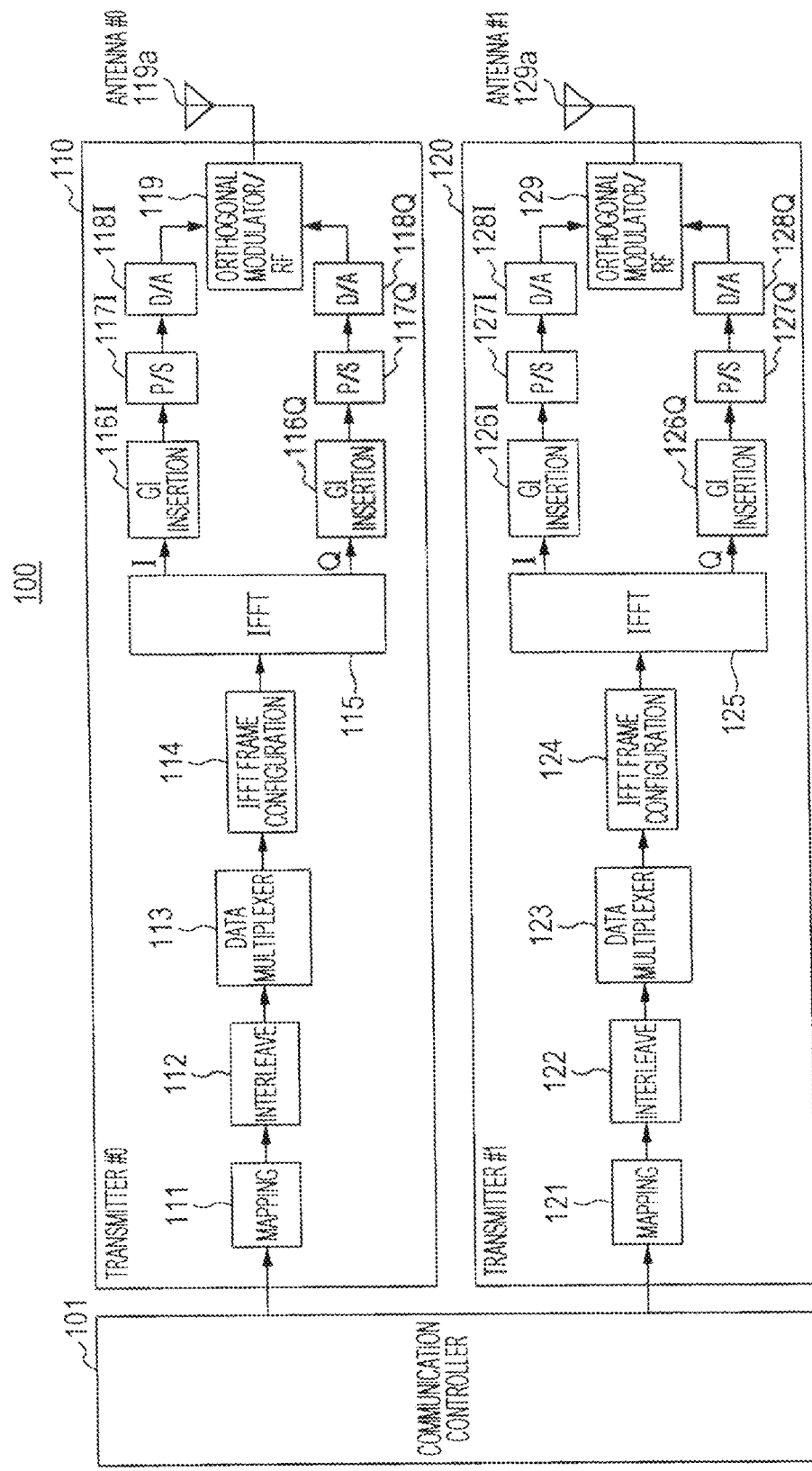
FIG. 2 is a block diagram illustrating transmitters of the MIMO system according to an embodiment.

FIG. 2 illustrates an exemplary transmitter of the MIMO system according to an embodiment. For sake of convenience, FIG. 2 depicts a base station 100 that includes two transmitters 110 and 120. In the following, the operation of the transmitter is described with reference to transmitter 110.

A data stream transmitted from the communication controller 101 is supplied to a mapping module 111. The mapping module 111 performs mapping of the data stream. Subsequently, data outputted from the mapping module 111 is supplied to an interleave module 112. The interleave module 112 performs an interleaving operation that spreads the data in accordance with a predetermined rule.

Data processed at the interleave module 112 is supplied to a data multiplexer 113 where a multiplexing operation is performed. Details of the multiplexing process are described later with reference to FIG. 4. Data multiplexed by the data multiplexer 113 is supplied to an inverse fast Fourier transform (IFFT) frame configuration module 114 that configures the data in frames on which an inverse fast Fourier transformation operation is performed by the IFFT module 115.

In the IFFT module 115, OFDM modulation is performed in order to obtain the transmission data of the in-phase (I) and quadrature (Q) components. Note that OFDM modulation incurs a transformation from the frequency domain to the time domain. The transmission data of I component and the transmission data of Q component are supplied to guard interval insertion modules 116I and 116Q, respectively, wherein guard intervals are inserted. Transmission data outputted from the guard interval insertion modules 116I and 116Q are supplied to parallel-to-serial converters 117I and 117Q, where the transmission data is converted to serial data. Serial data of I component and the Q component converted at the parallel-to-serial conversion modules 117I and 117Q is supplied to digital-to-analog converters 118I and 118Q. The digital to analog converters convert the serial data to analog signals.

Signals of I component and Q component converted by the digital-to-analog converters 118I and 118Q are supplied to a high-frequency orthogonal modulator 119. The orthogonal modulator 119 performs orthogonal modulation of the I component and the Q component, where upon the frequency of signal is converted to a predetermined transmission frequency. A transmission signal outputted from the orthogonal modulator 119 is supplied to a transmitter antenna 119a for wireless transmission.

The transmitter 120 has a similar configuration as the transmitter 110. In other words, a data stream sent from the communication controller 101 is supplied to a mapping module 121 and then to an interleave module 122, a data multiplexer 123, an IFFT frame configuration module 124, and an inverse fast Fourier transformation module 125, in that order, to be processed at each section. Further, transmission data of I component and Q component obtained at the IFFT module 125 is supplied to guard interval insertion modules 126I, 126Q, parallel-to-serial converters 127I, 127Q, digital-to-analog converters 128I, 128Q, and a high frequency orthogonal modulator 129 to obtain a transmission signal that is orthogonally modulated and frequency-converted to a predetermined transmission frequency. The transmission signal obtained from the orthogonal modulator 129 is supplied to the transmitter antenna 119b. Note that the transmission frequencies of wirelessly transmitted signals from the two transmitter antennas 119a and 119b are identical.

Figure 3:
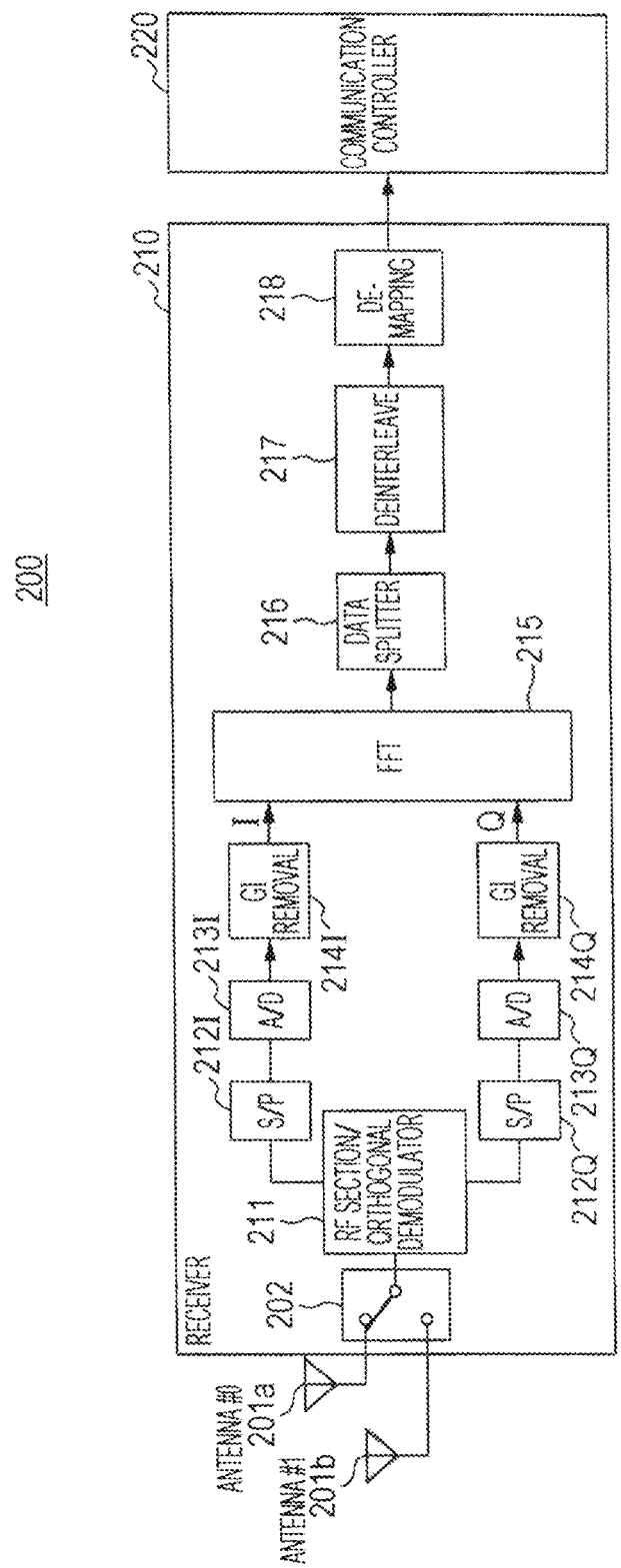
FIG. 3 depicts a block diagram of a receiver according to an embodiment.

FIG. 3 illustrates a block diagram of a receiver 200 according to an embodiment. The receiver 200 includes a single communication channel receiver 210 that includes two receiving antennas 201a and 201b that implement selection diversity.

A signal received with the receiver antenna 201a or 201b is selected by a switch 202. The selected signal is supplied to a high-frequency orthogonal modulator 211, wherein the wirelessly transmitted signal from the base station 100 (FIG. 1) at a predetermined frequency, is demodulated to obtain the in-phase (I) component and the quadrature (Q) component. The I component and the Q component of the transmission data are supplied to serial-to-parallel converters 212I and 212Q, respectively. The serial-to-parallel converters convert the respective serial I and Q data streams to parallel data. Further, the received data of the I component and the Q component, thus converted at the serial-to-parallel converters 212I and 212Q are supplied to analog-to-digital converters 213I and 213Q, respectively, and are converted to digital data.

The digital data obtained from the analog-to-digital converters 213I and 213Q is supplied to guard interval removal modules 214I and 214Q, where the guard intervals (GI) that are inserted by the transmitters are removed. I component data and Q component data of the received signal from which the guard intervals are removed, is supplied to a fast Fourier transformation (FFT) module 215.

The FFT module 215 performs a demodulation operation of the OFDM modulated signal and performs a transformation from the time domain to the frequency domain. Data converted by the fast Fourier transformation module 215 is supplied to a data splitter 216 that performs a splitting operation of the received data. Details regarding the splitting operation performed by the data splitter 216 are described later with reference to FIG. 6.

The received data thus split is supplied to a de-interleave module 217 that restores the data that was spread by the interleave module 112/122 at the time of transmission. The data restored by the de-interleave module 217 is supplied to a de-mapping module 218 for de-mapping. The received data that is de-mapped by the de-mapping module 218 is supplied to the communication controller 220 of the receiver 200.

Figure 4:
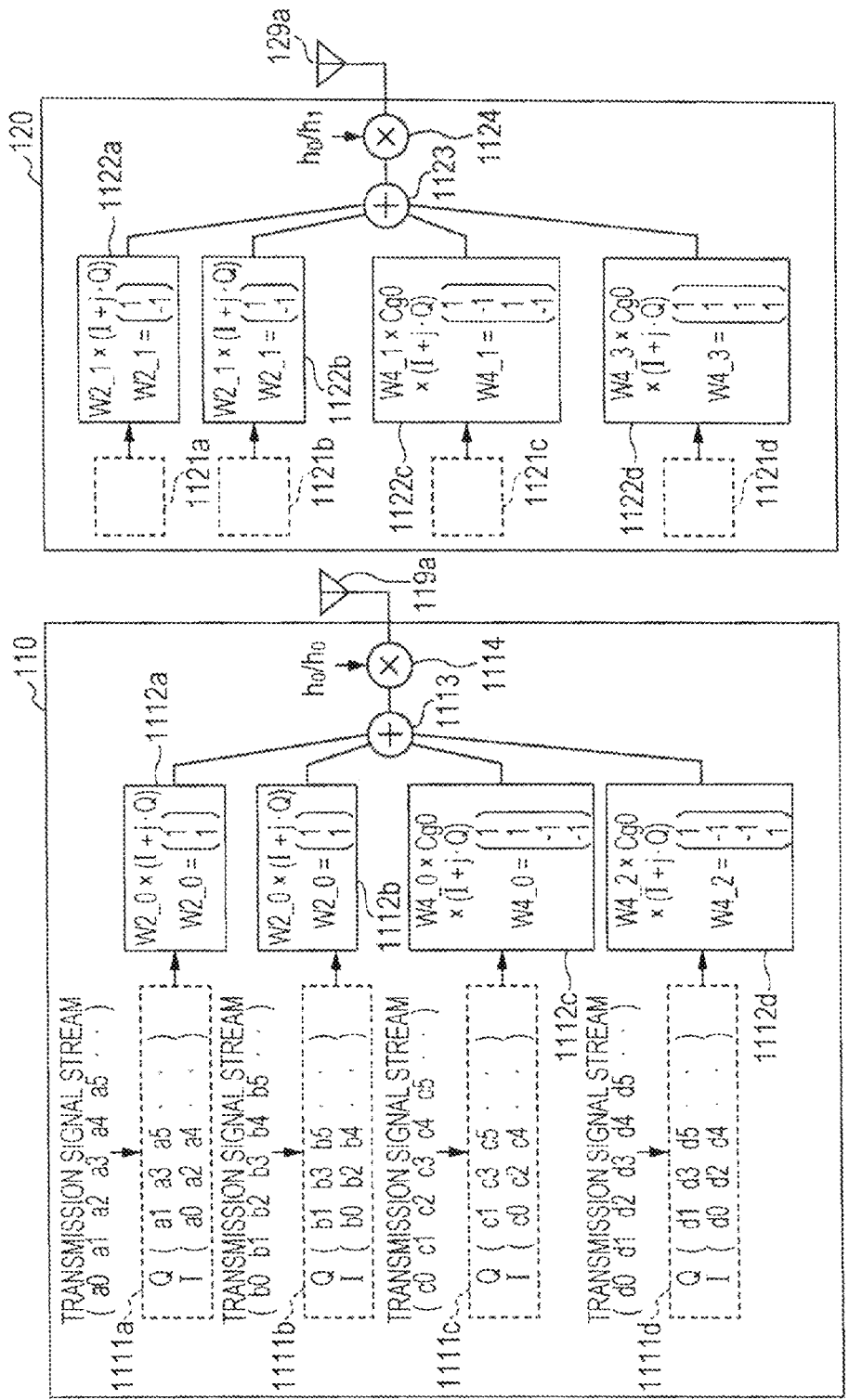
FIG. 4 illustrates an exemplary data multiplexing operation.

FIG. 4 illustrates an exemplary data multiplexing operation performed by the data multiplexers 113 and 123 of the transmitters 110 and 120 respectively.

At the transmitter 110, transmission data streams of digital data to be set at a particular frequency, which serves as input data for the inverse fast Fourier transformation module 115, are obtained as transmission data stream sequences 1111a, 1111b, 1111c, and 1111d, each of which include an alternate distribution of the I component and the Q component of the signal. Transmission data stream sequences 1112a, 1112b, 1112c, and 1112d are obtained by multiplying the I component and the Q component of the transmission data stream sequences 1111a, 1111b, 1111c, and 1111d by a matrix W2_0, W4_0, or W4_2. The transmission data stream sequences 1112a, 1112b, 1112c, and 1112d are summed at an adder 1113, and subsequently multiplied by a precoding coefficient at a multiplier 1114. For transmitter 110, the precoding coefficient is $[h_0/h_0]$, and thus the multiplier 1114 may be omitted. Note that the pre-coding coefficient is obtained via a feedback of the channel gain $h_0$ that is estimated by the receiver. A signal multiplied by this precoding coefficient is wirelessly transmitted from the transmitter antenna 119a as the signal Tx #0.

Similarly, for transmitter 120 that transmits the signal Tx #1, transmission data streams of digital data to be set at the predetermined frequency, are obtained as transmission data stream sequences 1121a, 1121b, 1121c, and 1121d, each of which include an alternate distribution of the I component and the Q component. Transmission data stream sequences 1122a, 1122b, 1122c, and 1122d are obtained by multiplying I component and Q component of the transmission data stream sequences 1121a, 1121b, 1121c, and 1121d by a matrix W2_1, W4_1, or W4_3. The transmission data stream sequences 1122a, 1122b, 1122c, and 1122d are summed at an adder 1123, and subsequently multiplied by a precoding coefficient. For transmitter 120, the precoding coefficient $[h_0/h_1]$ is multiplied at a multiplier 1124 and thereafter supplied to a transmit antenna 129a for wireless transmission. Note that the precoding coefficient $[h_0/h_1]$ is obtained by a feedback of the channel gains $h_0$ and $h_1$ that are estimated by the receiver. In other words, when the channel gain of the signal Tx #0 is $h_0$ and the channel gain of the signal Tx #1 is $h_1$, the precoding coefficient is set to $[h_0/h_1]$. A signal multiplied by this coefficient $1/h_1$ is wirelessly transmitted from the transmitter antenna 129a as the signal Tx #1. Therefore, according to one embodiment, the precoding coefficient for each transmitter is determined based on the estimation of channel gains performed by the receiver.

Further, in FIG. 4, for the transmission data stream sequences 1112a and 1112b, each stream may be represented by the following equations:

$$I = (a0, a2, a4 \ldots) \quad (1)$$

$$Q = (a1, a3, a5 \ldots) \quad (2)$$

wherein a0, a1, and the like represent data such as 1, −1, and the like. Further, code W2_0 is represented as:

$$W2\_0 = [1,1]^T \quad (3)$$

where "T" represents transpose of a matrix. The multiplication of matrix W2_0 and the data streams as shown in FIG. 4 produces the following equation:

$$(a0+j*a1, a0+j*a1, a2+j*a3, a2+j*a3 \ldots) \quad (4)$$

Similarly, for the transmission channel of transmitter antenna 129a, from which the signal Tx #1 is transmitted, the matrix W2_1 is multiplied. Thus, the following equation is used for transmit antenna 129a:

$$W2\_1 = [1,-1]^T \quad (5)$$

Accordingly, a result of multiplication is represented by the following equation:

$$(b0+j*b1, -b0-j*b1, b2+j*b3, -b2-j*b3 \ldots) \quad (6)$$

Note that W2_0 and W2_1 are codes that form second order Walsh codes, i.e., one type of orthogonal codes. Note that an orthogonal code different from the Walsh may also be used herein.

Further, for the transmission data stream sequences 1112c and 1112d of FIG. 4, fourth order Walsh multiplexing is performed. Walsh codes W4_0=(1,1,−1,−1) and code W4_2=(1,−1,−1,1) are assigned to the transmitter antenna 119a that transmits the signal Tx #0. Further, code W4_1=(1,−1,1,−1) and code W4_2=(1,1,1,1) are assigned to the transmitter antenna 129a, from which the signal Tx#1 is transmitted. Performing this process enables to spread one bit of data, which is included in a transmission stream, with the use of Walsh codes. In the following description, the unit of bits that form a Walsh code is referred to as a chip.

Further, as illustrated in FIG. 4, when the fourth order Walsh code is multiplied, a coefficient Cg0 is also multiplied at the same time to increase the signal amplitude. The value of coefficient Cg0 may be set to, for example, Cg0=1.1-1.5. Note that any other value larger than one may also be used as the value of coefficient Cg0.

Further, at the multipliers 1114 and 1124, the transmission streams are multiplied by the precoding coefficients $h_0/h_0$ and $h_0/h_1$ that are based on the channel gains $h_0$ and $h_1$. Note that the coefficient $h_0/h_0$ to be multiplied at the multiplier 1114 is 1. Thus, the multiplier 1114 may be omitted. The multiplier 1124 corresponds to the pre-coding module 104b included in transmitter 120 of FIG. 1. An aim of multiplying the pre-coding coefficient is to facilitate processing at the receiving side, as is described below. The signals obtained in a manner described above are added for each chip and form a single transmission stream for transmission.

Figure 5:
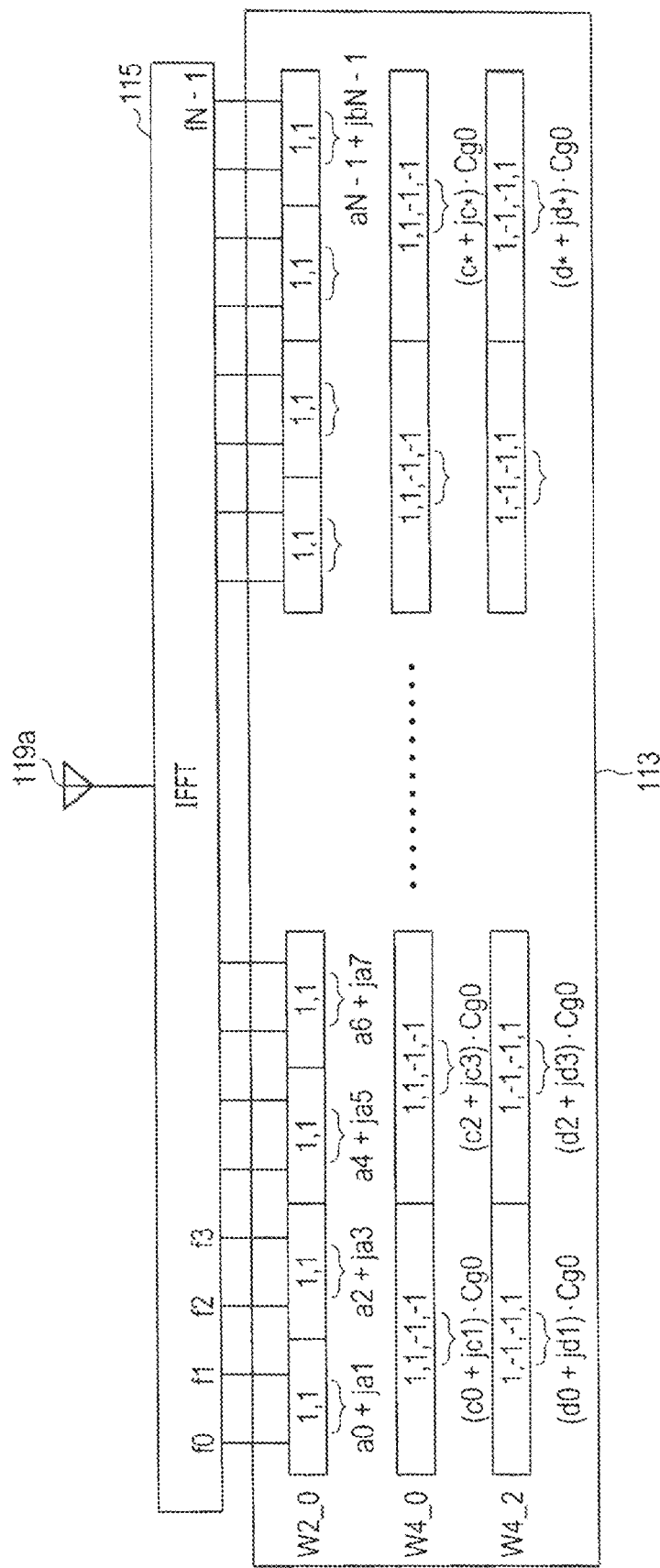
FIG. 5 illustrates a data arrangement according to an embodiment of the present disclosure.

FIG. 5 is a diagram illustrating data arrangement according to an embodiment of the present disclosure. FIG. 5 illustrates a data arrangement performed in the inverse fast Fourier transformation module 115 of the transmitter 110.

The data arrangement 113 shown in FIG. 5 is obtained by the process described in FIG. 4. The data may be, for example, obtained at the IFFT frame configuration module 114 and is supplied to the inverse Fourier transformation module 115.

As illustrated in FIG. 5, two pairs of two chips of the second order Walsh codes and one pair of four chips of the fourth order Walsh code are assigned to four subcarriers, for example, f0, f1, f2 and f3. Therefore, the four subcarriers form a unit to which a series of data may be assigned. Specifically, eight bit data (I and Q, one bit for each) is assigned to each time slot. Such an assignment is repeated across the entire frequency axis for N subcarriers on which inverse fast Fourier transformation is performed. Thus, the example as described in FIG. 5 enables the assignment of eight bits to four subcarriers, including four bits obtained with the second order Walsh and four bits obtained with the fourth order Walsh code.

Figure 6:
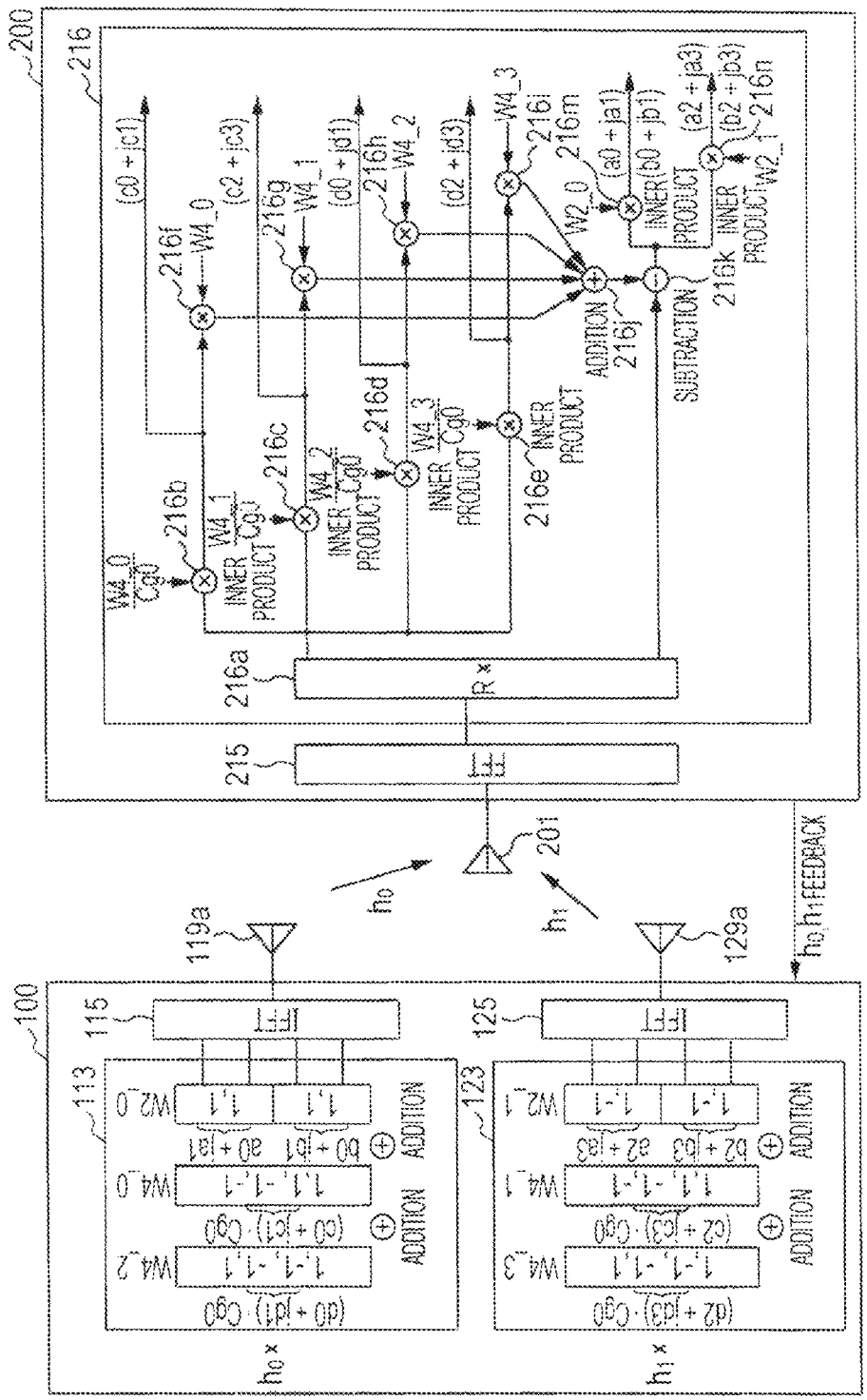
FIG. 6 illustrates an exemplary data splitting operation performed by a data splitter.

FIG. 6 illustrates a data splitting operation performed by the data splitter 216 of the receiver 200. Signals of two system (communication) lines transmitted from the base station 100 arrive at the receiver while being influenced by the channel gains $h_0$ and $h_1$ respectively. The received signals can be written as follows when sorting by Walsh codes:

$$\begin{aligned}\text{Received Signal} = &\{W2\_0*(a0,a1)+W2\_0*(b0,b1)+\\&W2\_1*(a2,a3)+W2\_1*(b2,b3)\}+\{W4\_0*(c0,\\&c1)+W4\_2*(d0,d1)+W4\_1*(c2,c3)+W4\_3*\\&(d2,d3)\}*Cg0.\end{aligned} \quad (7)$$

Here, for the sake of simplicity, it is assumed that the channel gains $h_0=1$ and $h_1=1$.

Specifically, the received signals at frequency $f_0$ to frequency $f_3$ after the transformation at the fast Fourier transformation module 215 can be expressed as:

$$\{(a0+j*a1)+(c0+j*c1)*Cg0+(d0+j*d1)*Cg0\}*h0+\{(a2+j*a3)+(c2+j*c3)*Cg0+(d2+j*d3)*Cg0\}*h1 \quad (8)$$

$$\{(a0+j*a1)+(c0+j*c1)*Cg0+(-1)*(d0+j*d1)*Cg0\}*h0+\{(-1)*(a2+j*a3)+(c2+j*c3)*Cg0+(-1)*(d2+j*d3)*Cg0\}*h1 \quad (9)$$

$$\{(b0+j*b1)+(-1)*(c0+j*c1)*Cg0+(-1)*(d0+j*d1)*Cg0\}*h0+\{(b2+j*b3)+(-1)*(c2+j*c3)*Cg0+(-1)*(d2+j*d3)*Cg0\}*h1 \quad (10)$$

$$\{(b0+j*b1)+(-1)*(c0+j*c1)*Cg0+(d0+j*d1)*Cg0\}*h0+\{(-1)*(b2+j*b3)+(-1)*(c2+j*c3)*Cg0+(d2+j*d3)*Cg0\}*h1 \quad (11)$$

To split these signals, as the first step, an inner product is calculated by multiplying higher order Walsh codes to the received signal. Specifically, at a multiplier 216b, a received data sequence 216a is multiplied by code W4_0, which is the fourth order Walsh code. At multiplier 216c, the received data sequence 216a is multiplied by code W4_1. Further, at a multiplier 216d, the received data sequence 216a is multiplied by code W4_2 and at multiplier 216e, the received data sequence 216a is multiplied by code W4_3. Furthermore, at each multiplication operation, the coefficient Cg0 is also multiplied.

According to the foregoing processes, the inner product (dot product) of two W4_* Walsh codes that are orthogonal to each other yields a zero value. As a result, from equation (7), the transmission signal (c0, c1, c2, c3, d0, d1, d2, d3) may be obtained. Note that C0, C1, and the like are +/−1. Thus, only the sign is obtained. Here, there is interference due to the second order Walsh code, and some data may not be decoded due to patterns such as a0, a1, and the like.

However, this may be avoided by utilizing a technique, wherein the fourth order Walsh code is multiplied by the coefficient Cg0. The technique is described in detail with reference to equations (8)-(11). For the sake of simplicity, it is assumed that data's imaginary part is zero in equations (8)-(11).

For instance, when (a0, b0, c0, d0)=(1, −1, −1, 1) the spreading results for the Walsh codes W2_0, W4_0, and W4_2 can be obtained are as follows:

For W2_0=[1, 1], the spreading result is obtained as the following sequence (a0*W2_0, b0*W2_0) which is (1, 1, −1, −1). Similarly, for the Walsh code W4_0=[1, 1, −1, −1], the spreading result is obtained as the following sequence (c0*W4_0) which is (−1, −1, 1, 1) and for Walsh code W4_2=[1, −1, −1, 1], the spreading result is obtained as the following sequence (d0*W4_2) which is (1, −1, −1, 1). Therefore, a summation result for each of the above chips is obtained as: Σchip=(1, −1, −1, 1). Accordingly, when a de-spreading operation is performed at the receiver, for the Walsh code W4_0=(1, 1, −1, −1), the inner product of the Walsh code and the total spreading result (i.e., Σchip) is obtained as: Inner product=1−1+1−1=0. Thus, when de-spreading is performed with code W4_0, C0=−1 has to be reproduced. However, in this case, the result yields a zero, which is a result of broken orthogonality.

Herein, when the fourth order Walsh code is multiplied by cg0=1.3, the following spreading sequences are obtained: for Walsh code W2_0, the spreading sequence is (a0*W2_0, b0*W2_0)=(1, 1, −1, −1). For the Walsh code W4_0, the spreading sequence is (c0*W4_0*cg0) which is (−1.3, −1.3, 1.3, 1.3) and for Walsh code W4_2, the spreading sequence is (d0*W4_0*cg0) which is (1.3, −1.3, −1.3, 1.3). Thus, a summation result for each of these chips is as follows: Σchip=(1, −1.6, −1, 1.6). Accordingly, when a de-spreading operation is performed at the receiver, for the Walsh code W4_0=(1, 1, −1, −1), the inner product of the Walsh code and the total spreading result (i.e., Σchip) is obtained as: Inner product=1−1.6+1−1.6=−1.2, and the reproduction can be successfully performed.

In other words, the above illustrative example enables to decode a signal even in the following case: when the coefficient cg0=1.3=1+0.3 is used, there may be a pattern in which the part "1" disappears due to interference of the second order Walsh. However, even in such a case, information of the fourth order Walsh code remains in the part "0.3", and decoding of signal may be performed successfully.

Returning to FIG. 6, as a second step in the data splitting operation, codes W4_0, W4_1, W4_2, and W4_3 are again multiplied at multipliers 216f, 216g, 216h, and 216i. The results are added at an adder 216j, and the added signal is subtracted from the received signal at a subtractor 216k. Referring to equation (7), the above operation of addition and subtraction corresponds to an operation of subtracting the terms relating to the fourth order Walsh codes from the received signal, where after only the terms relating to the second order Walsh codes remain.

As a third step of decoding the received signal, adders 216m and 216n obtain inner products of the result, which is obtained in a fashion similar to that as described above with the use of Walsh codes W2_0 and W2_1, respectively. In doing so, the receiver is enabled to split and decode the received streams (a0, a1, a2, a3, b0, b1, b2, b3).

Further, as illustrated in FIG. 6, as illustrated in FIG. 6, the channel gains $h_0$, $h_1$, etc., are fed back to the base station 100 from the receiver 200, and the precoding coefficients $h_0/h_0$, $h_0/h_1$, etc. based on the received channel gains are multiplied at the respective transmitter. Thus, the transmission signals from the respective transmitters 110, 120, etc., are equalized at the receiver, thereby making it possible to receive the signals in a suitable fashion. In other words, the transmitters 110-190 transmit respective reference signals for performing channel gain estimation to the receiver 200. The reference signals are arranged so as to follow an arrangement in a conventional OFDM. The arrangement is performed such that no overlapping occurs at OFDM time-frequency slots among the transmitter antennas. The receiver estimates the channel gains h0, h1, etc. and then transmits the information to the transmitters (base station).

Figure 7:
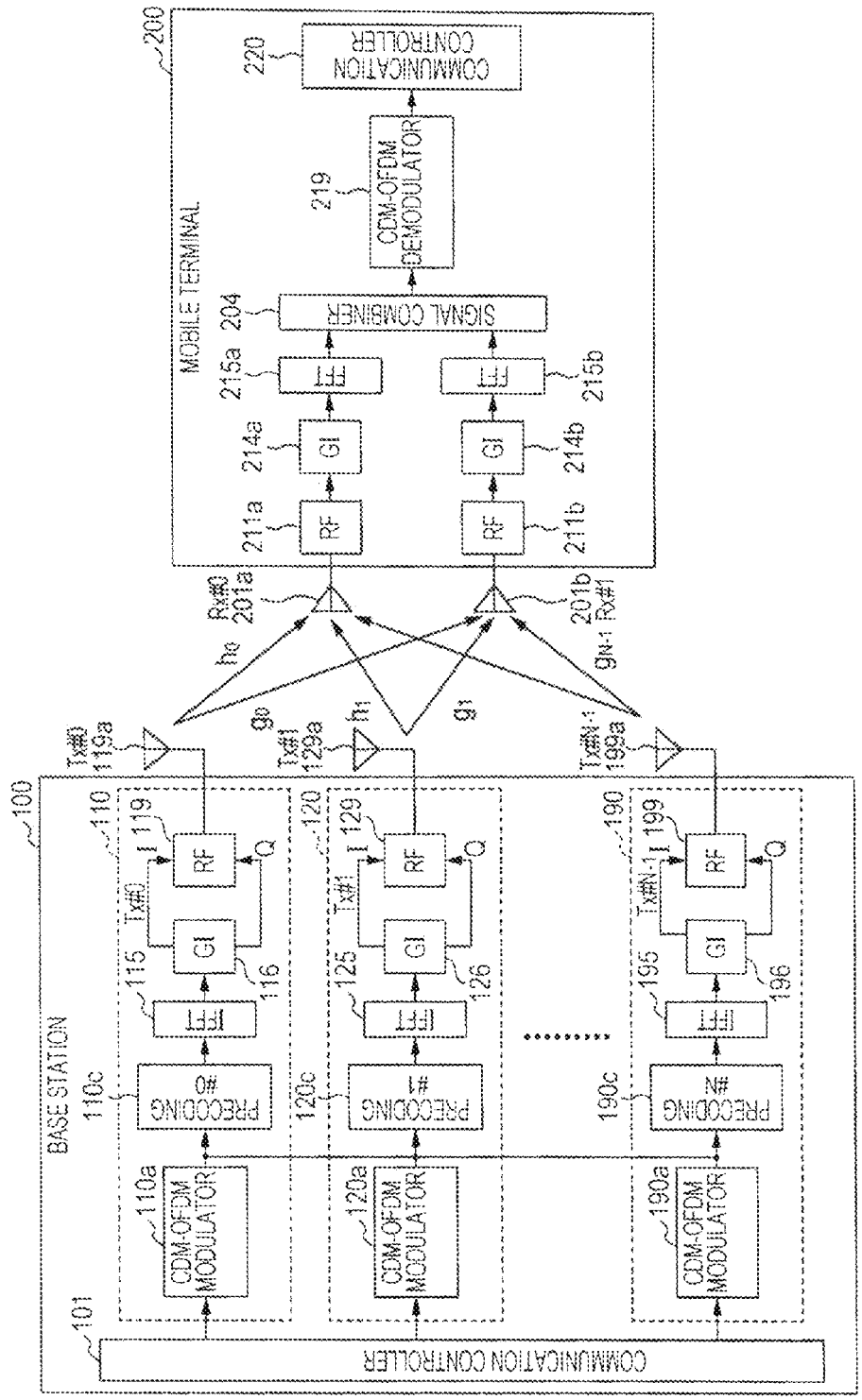
FIG. 7 is a block diagram illustrating a transmitter and receiver according to one embodiment.

FIG. 7 is a block diagram illustrating a transmitter and receiver according to another embodiment. Similar to the transmitter/receiver configuration described in FIG. 1, FIG. 7 illustrates only a part of the configuration of transmitters 110-190 (included in a base station 100) and a receiver (mobile terminal) 200. Further, for the sake of convenience, a description of the components that are similar to those of FIG. 1 is omitted herein.

In FIG. 1, selection diversity of the MIMO system was achieved by switching between the receiver antennas. In contrast, in the present embodiment, selection diversity is achieved by combining signals from multiple receiver antennas. The transmitters 110, 120 . . . 190 are included in a base station 100. The configuration of each transmitter in the present embodiment is different than the configuration of the transmitters as described in FIG. 1, in that the position of pre-coding modules is different. Specifically, for transmitter 110, the precoding module 110c is positioned between a CDMA-OFDM modulator 110a and an inverse fast Fourier transformation (IFFT) module 115. Similarly, each of the other transmitters 120-190 include the precoding module (120c-190c) disposed between the CDMA-OFDM modulator (1120a-190a) and the IFFT modules (125-195).

Further, the receiver (mobile terminal) 200 includes two receiver antennas 201a and 201b. The signals received by the receiver antennas 201a and 201b are processed separately up to a fast Fourier transformation module 215a and 215b, respectively. Specifically, the receiver antenna 201a is connected to a high-frequency orthogonal modulator 211a. The orthogonal modulator 211a converts the frequency of a signal received at the receiver antenna 201a and performs orthogonal demodulation. A demodulated signal is supplied to a guard interval removal section 214a. The guard interval removal section 214a removes guard intervals inserted by the transmitter. A signal from which the guard intervals are removed is supplied to a fast Fourier transformation module 215a. The Fourier transformation module 215a performs a transformation operation wherein the input signal is transformed from the time domain to a frequency domain. The output signal of the fast Fourier transformation module 215a is supplied to a signal combiner 204.

The signal received by the receiver antenna 201b is processed in a similar manner as that described above with respect to receiver antenna 201a. The received signal is processed by a high-frequency orthogonal modulator 211b, guard interval removal section 214b, and a fast Fourier transformation module 215b. The output signal of the fast Fourier transformation module 215b is supplied to the signal combiner 204. The signal combiner 204 combines the two received signals from receiver antennas 201a and 201b, respectively and supplies the combined signal to a CDMA-OFDM demodulator 219, where after the demodulated signal is supplied to a communication controller 220.

In what follows, an example of how the precoding coefficients are multiplied by the precoding modules 110c, 120c . . . . 190c to the respective transmission data is described. As illustrated in FIG. 7, channel gains between corresponding antennas are labelled $h_0$, $h_1$ . . . $h_{N-1}$ for signals transmitted from transmitter antennas 119a, 129a, . . . 199a to the receiver antenna 201a, and the channel gains for signals transmitted from the transmitter antennas 119a, 129a, . . . 199a to the receiver antenna 201b are labelled $g_0, g_1, \ldots g_{N-1}$. Furthermore, the signal combining operation performed by the signal combiner is also described with reference to FIG. 8.

The precoding modules 110c-190c of each transmitter 110-190, determine the respective precoding coefficients based on signals transmitted by other transmitters. In order to simplify the description, it is assumed herein that the transmitted signals from two transmitters 110 and 120 are received by the receiver 200. It is also assumed that T0 and T1 are input data of the inverse Fourier transformation modules 115 and 125 of the two transmitters 110 and 120 and R0 and R1 are output data of the fast Fourier transformation modules 215a and 215b of the receiver 200.

Therefore the relation between the inputs (T0 and T1) and the outputs (R0 and R1) can be expressed as follows:

$$\begin{pmatrix} R0 \\ R1 \end{pmatrix} = \begin{pmatrix} h_0 & h_1 \\ g_0 & g_1 \end{pmatrix} * \begin{pmatrix} T0 \\ T1 \end{pmatrix} \quad (12)$$

A determinant X is multiplied to perform precoding at the transmitting side so as to equalize sizes of received data R0 and R1 at the receiver 200. As a result, equation (12) is rewritten as follows:

$$\begin{pmatrix} R0 \\ R1 \end{pmatrix} = \begin{pmatrix} h_0 & h_1 \\ g_0 & g_1 \end{pmatrix} * \begin{pmatrix} x0 & x0 \\ x1 & x1 \end{pmatrix} * \begin{pmatrix} T0 \\ T1 \end{pmatrix} \quad (13)$$

$$\begin{pmatrix} R0 \\ R1 \end{pmatrix} = \begin{pmatrix} G_0 & G_0 \\ G_1 & G_1 \end{pmatrix} * \begin{pmatrix} T0 \\ T1 \end{pmatrix} \quad (14)$$

wherein x0 and x1 are multiplication coefficients of precoding matrix X, and $G_0$ and $G_1$ are diversity gains. Further, from equations (13) and (14) the following equation can be obtained, wherein the exponent expression of "−1" represents an inverse matrix.

$$\begin{pmatrix} x0 \\ x1 \end{pmatrix} = \begin{pmatrix} h_0 & h_1 \\ g_0 & g_1 \end{pmatrix}^{-1} * \begin{pmatrix} G_0 \\ G_1 \end{pmatrix} \quad (15)$$

Further, at the precoding module 110c of the transmitter 110, an operation of X0*(T0+T1) is performed, whereas the precoding module 120c of the transmitter 120 performs the operation of X1*(T0+T1). The transmission data are further subjected to an inverse fast Fourier transformation at the IFFT modules 115 and 125. Subsequently, the transmitters 110 and 120 transmit signals Tx #0 and Tx #1 from the transmitter antennas 119a and 129a respectively. Referring to equation (14), the diversity gains $G_0$ and $G_1$ of the MIMO communication system may be selected in advance, thus allowing the diversity gains to be adaptably set and modified.

In the receiver 200, R0 and R1 of equation (14) are obtained as a result of fast Fourier transformation at the fast Fourier transformation modules 215a and 215b, which are performed on the received signals of the two receiver antennas 201a and 201b. The signal combiner 204 sums the output data R0 and R1. Thus, the received signal can be expressed as:

Received-combined signal=$R0+R1=(G_0+G_1)*(T0+T1)$ (16)

Therefore, the received signal is multiplied by the diversity gain of ($G_0+G_1$). Furthermore, in the forgoing description, an example with two receiver antennas is described. However, the above described technique is also applicable to a case where the number of receiver antennas is expanded to N (N is an integer of two or more). In this case $G_0, G_1, G_2 \ldots G_{N-1}$, are the diversity gains, and equation (13) can be rewritten as:

$$\begin{pmatrix} R0 \\ R1 \end{pmatrix} = \quad (17)$$

$$\begin{pmatrix} h_0 & h_1 & \cdots & h_{N-1} \\ g_0 & g_1 & \cdots & g_{N-1} \end{pmatrix} * \begin{pmatrix} G_0 & G_0 & \cdots & G_0 \\ G_1 & G_1 & \cdots & G_1 \\ \cdots & \cdots & \cdots & \cdots \\ \cdots & \cdots & \cdots & \cdots \\ G_{N-1} & G_{N-1} & \cdots & G_{N-1} \end{pmatrix} * \begin{pmatrix} T0 \\ T1 \\ \cdots \\ \cdots \\ TN-1 \end{pmatrix}$$

Accordingly, as described above, when two or more receiver antennas are included in the MIMO system, a combined output of the antennas may be obtained, thus enabling the reception signal-to-noise (SN) ratio to be equal to or better than that SN ratio achievable by the maximum ratio combining diversity technique.

According to another embodiment, the communication controller 220 of the receiver 200 may be configured to measure the SN ratios of the received signals of the two receiver antennas 201a and 201b. Further, the communication controller 220 may be configured to determine as to which receiver antenna has a less preferable SN ratio, and accordingly set the diversity gain of the less preferable receiver antenna to zero, and notify the base station 100. For instance, suppose that the receiver antenna 201b is determined as the less preferable receiver antenna based on the SN ratio measurements of the received signals from the two receiver antennas 201a and 201b, the communication controller 220 may set the diversity gain G1 to zero and accordingly notify the base station. Thus, the reception power at the receiver antenna 201b is zero, and the signal combiner 204 achieves a state which corresponds to a state wherein the combiner is not connected to receiver antenna 201b. Accordingly, the MIMO system can perform selection diversity by disabling the less preferable receiver.

According to another embodiment, the receiver of the MIMO system may be further configured to transmit an instruction to the base station 100, such that the base station is notified to not perform the precoding operation when the inverse matrix represented in equation (15) does not exists. Thus, in this case where no inverse matrix of equation (15) exists, such as the case wherein the channel matrix of equation (12) is not regular or the case where the elements of the inverse matrix of equation (15) become very large, the desired transmission power from the base station 100 becomes too large/unacceptable to perform transmission. Usually, it may be assumed that such a case corresponds to the case where the value of each element of the channel matrix becomes substantially the same as other elements. In other words, for the case of two receiver antennas 201a and 201b, the propagation routes of the radio waves from the base station 100 to the receiver 200 follow almost the same path and arrive at the receiver while being influenced by the same scattering environment. Accordingly, in such a case, it is conceived that the sizes of transmission data T0 and T1 obtained at the receiver 200 may have substantially the same value even without precoding. Thus, the signal reception may be performed even when the multiplication of precoding coefficient is omitted.

Figure 8:
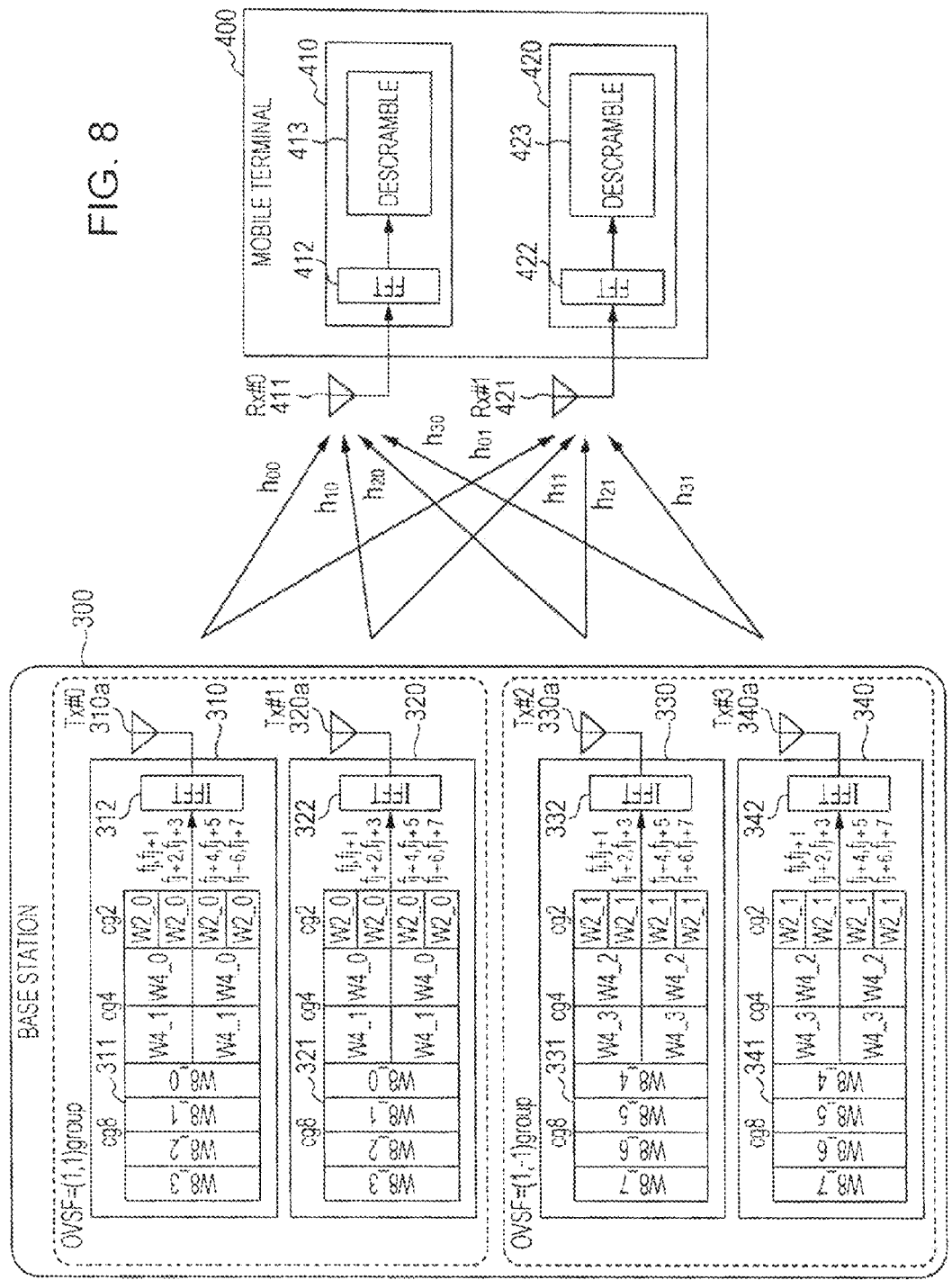
FIG. 8 is a block diagram illustrating a transmitter and receiver configuration according to another embodiment of the disclosure.

FIG. 8 is a block diagram illustrating a transmitter and receiver configuration according to another embodiment. In the transmitter/receiver configuration depicted in FIG. 8 no diversity is implemented. Such a transmitter and receiver configuration is described in prior U.S. provisional patent application No. 61/776,470, and is incorporated herein by reference.

In FIG. 8, a base station 300 includes four transmitters 310, 320, 330, and 340 and a mobile terminal 400 includes two receivers 410, and 420 thereby forming a (4×2) MIMO communication system. In the transmitters 310-340, only data multiplexers 311, 321, 331, and 341, inverse fast Fourier transformation (IFFT) modules 312, 322, 332, and 342, and transmitter antennas 310a, 310b, 310c, and 310d are illustrated. The other components such as high-frequency OFDM modulators as described in FIG. 2 may be used.

Orthogonal variable spreading factor (OVSF) codes are assigned to the four sets of transmission data of the transmitters 310-340. The OVSF codes belonging to Walsh code W2_0=(1,1) are assigned to a signal Tx#0 to be transmitted from the transmitter antenna 310a and to a signal Tx#1 to be transmitted from the transmitter antenna 320a. Further, the OVSF codes belonging to Walsh code W2_1=(1,-1) are assigned to a signal Tx#2 to be transmitted from the transmitter antenna 330a of the transmitter 330 and a signal Tx#3 to be transmitted from the transmitter antenna 340a of the transmitter 340.

According to one embodiment, the transmitters 310-340 each generate a transmission data sequence in which a second order OVSF code, a fourth order OVSF code, and an eighth OVSF code are added. While adding the second, fourth, and the eighth order OVSF codes at each of the transmitters 310-340, only a subset of the codes in the second, fourth, and the eighth order OVSF codes are used. Specifically, the transmitter 310 assigns Walsh code W2_0 as the second order OVSF code, Walsh code W4_0 and W4_1 as the fourth order OVSF codes, and Walsh codes W8_0, W8_1, W8_2, and W8_3 as the eighth order OVSF codes. The same set of codes (as those assigned to transmitter 310) is assigned to the transmitter 320.

Further, the transmitter 330 assigns codes W2_1 as the second order OVSF code, codes W4_2 and W4_3 as the fourth order OVSF codes, and codes W8_4, W8_5, W8_6, and W8_7 as the eighth order OVSF codes. The same set of codes (as those assigned to transmitter 330) is assigned in the transmitter 340.

Signals transmitted from the respective transmitters 310-340 include reference signals that are transmitted in time-frequency slots that are different among the transmitters 310-340. Transmitting the discrete reference signals in such a fashion, enables the receiver 410 and 420 to acquire channel information of the transmission signals Tx#0, Tx#1, Tx#2, and Tx#3 from the respective antennas 310a, 320a, 330a, and 340a.

In FIG. 8, the receivers are depicted as including receiver antennas 411 and 421, Fourier transformation modules 412 and 422, and descramblers 413 and 423. Other components such as the high-frequency modulators (as described in FIG. 3) can be included. In the receivers 410 and 420, a signal Matrix_A as illustrated in FIG. 9 is obtained by acquiring channel information of the received four signals transmission from transmitters Tx #0, Tx #1, Tx #2, and Tx #3.

The descramblers 413 and 423 of the receivers 410 and 420, are each capable of splitting the signal Matrix_A into a signal Matrix_B1 and a signal Matrix_B2, as illustrated in FIG. 9 by performing de-spreading operation by using Walsh code W2_0 and/or W2_1. Such a splitting operation utilizes the orthogonality of the OVSF codes. Note that from the signal Matrix_B1, the transmission signals Tx #0 and Tx #1 may be obtained. Similarly, from the signal Matrix_B2, the transmission signals Tx #2 and Tx #3 may be obtained. Note that the spreading codes inside the respective transmission signals Tx#0-Tx#3 are not orthogonal to each other, thereby enabling the descramblers 413 and 423 to demodulate the respective transmission signals successfully.

Figure 10:
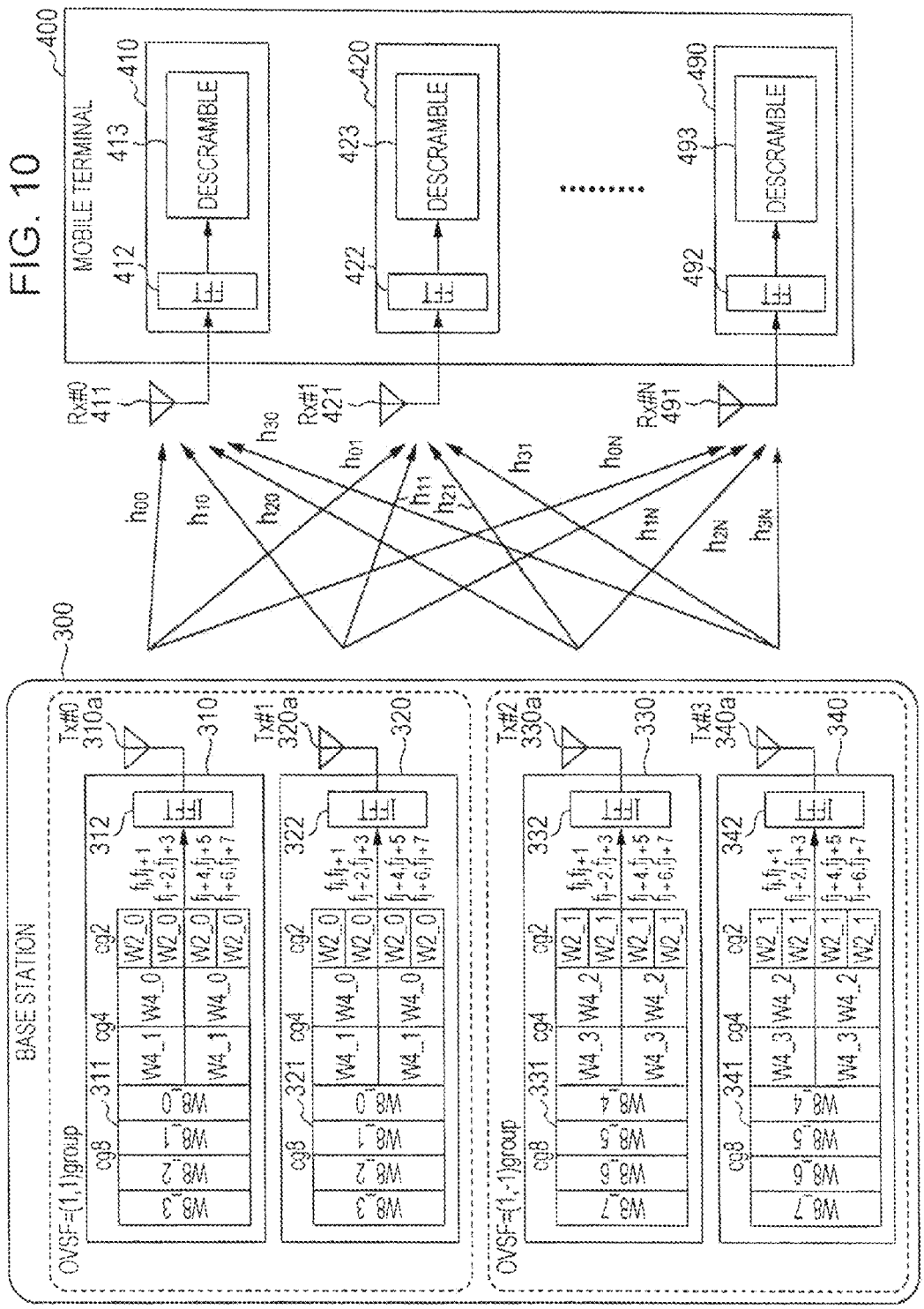
FIG. 10 is a block diagram of a transmitter and a receiver according to another embodiment of the disclosure.

FIG. 10 is a block diagram of a transmitter and a receiver according to another embodiment of the present disclosure. The transmitter-receiver configuration as depicted in FIG. 10 is similar to the transmitter-receiver configuration described in FIG. 8, in that the transmitters 310-340, each sum the second order, the fourth order, and the eighth order OVSF codes to generate the transmission signals.

However, the transmitter-receiver configuration of FIG. 10 includes three or more receivers 410-490 i.e., in general a total of N+1 receivers 410-490, wherein N is an integer that is greater than two. The receivers 410-490 include single receiver antennas 411-491, respectively. The receivers 410-490 demodulate received signals Rx#0, Rx#1 . . . Rx# N, which are obtained from the corresponding receiver antennas 411-491. From the receivers 410-490 of FIG. 10, two receiver antennas are arbitrarily selected from the N receiver antennas 411-491, after obtaining channel matrixes based on the reference signals. Subsequently, as illustrated in FIG. 11, with respect to the received signals of the selected two receiver antennas, a signal Matrix_A is split to a signal Matrix_B1 and a signal Matrix_B2.

Accordingly, a combination of two receivers that has a largest communication channel capacity is determined. The communication channel capacity may be expressed as:

$$C = \log\left(\det\left(1 + \frac{\gamma 0}{N} \cdot H^H H\right)\right) \tag{18}$$

where γ0 is the average SN ratio of the receiver antennas, and H is the signal Matrix_B1 and Matrix_B2. In equation (18), det is a determinant operator of a matrix and the index "H" indicates a transpose-conjugate operation of a matrix.

According to an embodiment, when the number of the receivers (the number of receiver antennas) is M, the example of FIG. 10 may be expanded to the case where a transmission system includes N transmitters and (N/2)+M receivers. Further, at the receiving side, a combination of two antennas is selected therefrom, and equation (18) is calculated, thereby making it possible to select the most suitable receiver antennas. Thus, appropriate diversity may be achieved.

The example depicted in FIG. 10 illustrates an example in which selection diversity is implemented wherein the receiver selects two receiver antennas of a plurality of receiving antennas. Alternatively, a combining diversity technique that sums the received signals may also be implemented. For example, when the number of receiver antennas 411-419 in the example of FIG. 10 is four or more, a received signal can be obtained and further demodulated with respect to each pair of the receiver antennas by the processes illustrated in FIG. 8 and FIG. 9. Subsequently, to achieve combining diversity, the received signals of all the receiver pairs can be summed.

Note that in the examples of the respective embodiments described herein, it is assumed that the transmitter of a base station transmits signals to the receiver of a mobile terminal. However, similar processing may be performed when a transmitter included in the mobile terminal transmits signals to a receiver of the base station. Thus, a multi user MIMO (MU-MIMO) is also realizable by the present embodiments. Furthermore, the modules described in the above embodiments may be realized via processing circuits in hardware, software or a combination of a hardware and software configurations. Specifically, each of the functions/methods/processes described in the above embodiments may be implemented by one or more processing circuits (or circuitry). A processing circuit includes a programmed processor and may also include devices such as an application specific integrated circuit (ASIC) and conventional circuit components arranged to perform the recited functions.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the present disclosure is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A multiple-input multiple-output (MIMO) communication method for a transmitter including N transmitter antennas and a receiver including M receiver antennas, where N and M are integers greater than or equal to two, the communication method comprising:
    transmitting, by each transmitter antenna, a digital sequence including a first portion and a second portion, wherein the first portion is multiplied by a first type of orthogonal code and the second portion is multiplied by a predetermined coefficient and a second type of orthogonal code, the transmitted digital sequence being multiplied by a pre-coding coefficient that is determined by the receiver;
    demodulating, by processing circuitry, the received digital sequences of each receiver antenna by multiplying the received digital sequences by the first type of orthogonal code and the second type of orthogonal code;
    first determining based on the demodulated digital sequences of the receiver antennas, a receiver antenna that has a highest signal-to-noise ratio; and
    notifying the transmitter of the pre-coding coefficient corresponding to the determined receiver antenna.

2. The communication method of claim 1, wherein the first type of orthogonal code is of a first predetermined order and the second type of orthogonal code has an order that is twice the order of the first predetermined order.

3. The communication method of claim 1, wherein the first determining step further comprises:
    computing the pre-coding coefficient corresponding to the determined receiver antenna based on channel gains between the transmitter antennas and the receiver antennas and diversity gains of the receiver antennas.

4. The communication method of claim 3, further comprising:
    setting, by the processing circuitry, the diversity gain of a first receiver antenna that is not used in the MIMO communication to zero; and
    informing the transmitter about the set diversity gain of the first receiver antenna.

5. The communication method of claim 3, further comprising:
    second determining by the receiver, whether at least one of the channel gains between the transmitter antennas and receiver antennas is regular and a transmission power of the receiver is high;
    transmitting, by the receiver, an indicator signal to the transmitter based on the determining, the indicator signal indicating the transmitter to perform transmission of digital sequences without multiplying the pre-coding coefficients to the digital sequences.

6. The communication method of claim 1, further comprising:
    setting the number of receiver antennas M to be equal to N/2, where N is the number of transmitter antennas;
    determining channel gains between the set number of receiver antennas and transmitter antennas;
    computing based on the determined channel gains, a channel capacity for each pair of receiver antennas; and
    determining a pair of receiver antennas having a largest channel capacity, as the receiver antenna pair to be used for MIMO communication.

7. The communication method of claim 1, wherein the demodulating step further comprises:
    performing, by the processing circuitry, a Fourier transformation of the digital sequences received by each receiver antenna;
    computing a first inner product of the Fourier transformed digital sequences with the second type of orthogonal code; and
    dividing the computed inner product by the predetermined coefficient to obtain a first decoded digital sequence.

8. The communication method of claim 7, further comprising:
    multiplying the first decoded digital sequence by the second type of orthogonal code;
    subtracting the multiplied first decoded digital sequence from the Fourier transformed digital sequence; and
    computing a second inner product of the subtracted digital sequence with the first type of orthogonal code to obtain a second decoded digital sequence.

9. A MIMO transmitter comprising:
    a plurality of transmitter antennas configured to transmit digital sequences at a predetermined transmission frequency; and
    circuitry configured to:
        obtain, for each transmitter antenna, a digital sequence of the digital sequences including a first portion and a second portion, wherein the first portion is multiplied by a first type of orthogonal code and the second portion is multiplied by a predetermined coefficient and a second type of orthogonal code,
        compute an inverse Fourier transform of the digital sequence to obtain an inphase component and a quadrature phase component of the digital sequence, and
        orthogonally modulate the in-phase and quadrature components of the digital sequence to transmit the digital sequence at the predetermined transmission frequency, wherein the transmitted digital sequence is multiplied by a pre-coding coefficient that is determined by a receiver.

10. The MIMO transmitter of claim 9, wherein the circuitry is further configured to:
    insert guard intervals of a predetermined length in the in-phase and the quadrature phase components of the digital sequence.

11. The MIMO transmitter of claim 9, wherein the first type of orthogonal code is of a first predetermined order and the second type of orthogonal code has an order that is twice the order of the first predetermined order.

12. A MIMO receiver comprising:
    a plurality of receiver antennas configured to receive digital sequences transmitted by a plurality of transmitter antennas; and circuitry configured to:
   demodulate, for each receiver antenna, a received digital sequence of the received digital sequences by multiplying the received digital sequences by a first type of orthogonal code and a second type of orthogonal code;
   determine based on the demodulated digital sequences of the receiver antennas, a receiver antenna that has a highest signal-to-noise ratio;
   compute a pre-coding coefficient corresponding to the determined receiver antenna based on channel gains between the transmitter antennas and the receiver antennas, and diversity gains of the receiver antennas, and
   notify the transmitter of the pre-coding coefficient corresponding to the determined antenna.

13. The MIMO receiver of claim 12, wherein the circuitry is further configured to:
   set a diversity gain of a first receiver antenna that is not used in MIMO communication to zero; and
   inform the transmitter about the set diversity gain of the first receiver antenna.

14. The MIMO receiver of claim 12, wherein the circuitry is further configured to:
   determine whether at least one of the channel gains between the transmitter antennas and receiver antennas is regular and a transmission power of the MIMO receiver is high; and
   transmit an indicator signal to a transmitter indicating the transmitter to perform transmission of digital sequences without multiplying the pre-coding coefficient to the digital sequence.

15. The MIMO receiver of claim 12, wherein the circuitry is further configured to:
   set a number of receiver antennas M to be equal to N/2, where N is the number of transmitter antennas;
   determine channel gains between the set number of receiver antennas and transmitter antennas;
   compute based on the determined channel gains, a channel capacity for each pair of receiver antennas; and
   determine a pair of receiver antennas having a largest channel capacity, as the receiver antenna pair to be used for MIMO communication.

16. The MIMO receiver of claim 12, wherein the circuitry is further configured to:
   perform a Fourier transformation of the digital sequences received by each receiver antenna;
   compute a first inner product of the Fourier transformed digital sequences with the second type of orthogonal code; and
   divide the computed inner product by the predetermined coefficient to obtain a first decoded digital sequence.

17. The MIMO receiver of claim 16, wherein the circuitry is further configured to:
   multiply the first decoded digital sequence by the second type of orthogonal code;
   subtract the multiplied first decoded digital sequence from the Fourier transformed digital sequence; and
   compute a second inner product of the subtracted digital sequence with the first type of orthogonal code to obtain a second decoded digital sequence.

18. The MIMO receiver of claim 12, wherein the first type of orthogonal code is of a first predetermined order and the second type of orthogonal code has an order that is twice the order of the first predetermined order.

19. The MIMO receiver of claim 12, wherein the circuitry is further configured to:
   orthogonally demodulate the received digital sequence to obtain an in-phase component and a quadrature phase component of the received digital sequence, and
   perform a Fourier transform of the in-phase and quadrature phase components of the received digital sequence.

20. The MIMO receiver of claim 19, wherein the circuitry is further configured to:
   remove guard intervals of a predetermined length from the in-phase and the quadrature phase components of the received digital sequence.

* * * * *